United States Patent
Zhou

(10) Patent No.: US 11,317,625 B2
(45) Date of Patent: *May 3, 2022

(54) FLUMIOXAZIN COMPOSITIONS AND METHODS OF USE THEREOF

(71) Applicant: Valent U.S.A. LLC, Walnut Creek, CA (US)

(72) Inventor: Ke Zhou, San Ramon, CA (US)

(73) Assignee: VALENT U.S.A., LLC, Walnut Creek, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 16/140,905

(22) Filed: Sep. 25, 2018

(65) Prior Publication Data

US 2019/0098894 A1      Apr. 4, 2019

Related U.S. Application Data

(60) Provisional application No. 62/565,994, filed on Sep. 29, 2017.

(51) Int. Cl.
| | | |
|---|---|---|
| *A01N 25/10* | (2006.01) | |
| *A01N 25/30* | (2006.01) | |
| *A01N 57/20* | (2006.01) | |
| *A01N 25/22* | (2006.01) | |
| *A01N 43/90* | (2006.01) | |
| *A01N 43/84* | (2006.01) | |
| *A01N 25/06* | (2006.01) | |
| *A01N 25/04* | (2006.01) | |

(52) U.S. Cl.
CPC ............ *A01N 25/10* (2013.01); *A01N 25/04* (2013.01); *A01N 25/06* (2013.01); *A01N 25/22* (2013.01); *A01N 25/30* (2013.01); *A01N 43/84* (2013.01); *A01N 43/90* (2013.01); *A01N 57/20* (2013.01)

(58) Field of Classification Search
None
See application file for complete search history.

(56) References Cited

U.S. PATENT DOCUMENTS

| | | |
|---|---|---|
| 8,093,184 B2 † | 1/2012 | Kawanaka |
| 2007/0066486 A1 * | 3/2007 | Kawanaka ............ A01N 57/20 504/206 |
| 2012/0245030 A1 † | 9/2012 | Iwata |
| 2013/0143742 A1 | 6/2013 | Ikeda |

OTHER PUBLICATIONS

SDS for STEPFAC TSP-PE K on Stepan website [online], retrieved from the internet on (Jun. 19, 2021) from URL< https://www.stepan.com/content/dam/stepan-dot-com/webdam/website-product-documents/safety-data-sheets/sds-US/en/00756400.pdf>.*
International Preliminary Report on Patentability and Written Opinion dated Mar. 31, 2020.

* cited by examiner
† cited by third party

*Primary Examiner* — John Pak
*Assistant Examiner* — Daniel L Branson
(74) *Attorney, Agent, or Firm* — Wood, Phillips, Katz, Clark & Mortimer

(57) ABSTRACT

The present invention is directed to flumioxazin suspension concentrates containing a polyoxyethylene polyarylphenol phosphate or phosphate ester acid salts thereof. The present invention is further directed to a method of controlling weeds by applying compositions of the present invention.

3 Claims, No Drawings

FLUMIOXAZIN COMPOSITIONS AND METHODS OF USE THEREOF

FIELD OF THE INVENTION

The present invention relates to aqueous flumioxazin suspension concentrates containing a polyoxyethylene polyarylphenol phosphate or phosphate ester acid salts thereof. The present invention further relates to a method of controlling weeds by applying compositions of the present invention.

BACKGROUND OF THE INVENTION

Unwanted plants, such as weeds, reduce the amount of resources available to crop plants and can have a negative effect on crop plant yield and quality. For example, a weed infestation reportedly was responsible for an 80% reduction in soybean yields. Bruce, J. A., and J. J. Kells, *Horseweed (Conyza Canadensis) control in no-tillage soybeans (Glycine max) with preplant and preemergence herbicides*, Weed Technol. 4:642-647 (1990). Therefore, controlling weeds is a major concern of crop growers. Unwanted plants in crop plant environments include broadleaves, grasses and sedges.

Flumioxazin is a protoporphyrinogen oxidase ("PPO") inhibitor herbicide used to control weeds among soybeans, peanuts, orchard fruits and many other agricultural crops in the United States and worldwide. For herbicide-resistant weed management, flumioxazin is often tank mixed with other pesticides prior to application.

High concentration flumioxazin formulation is preferable because relatively easy to handle, transport and store. However, high concentrations of flumioxazin have poor stability. This poor stability affects the storage, handling and application of the flumioxazin formulations due to precipitates formed during storage. Further physical instability including phase separation, crystallization of active or inert ingredient, settling or sedimentation of a component, gelling, agglomeration, etc., often do not become apparent immediately upon preparation of the composition, but instead are time and temperature dependent. Thus, there is a need in the art for stable high concentration flumioxazin formulations that remain stable for an extended period and across a range of temperatures.

SUMMARY OF THE INVENTION

In one embodiment, the present invention is directed to an aqueous herbicidal suspension composition comprising flumioxazin and a polyoxyethylene polyarylphenol phosphate or phosphate ester acid salts thereof.

In another embodiment, the present invention is directed to an aqueous herbicidal suspension composition comprising from about 30% to about 50% w/w flumioxazin, an acrylic graft copolymer, a polyoxyethylene polyarylphenol phosphate or phosphate ester acid salts thereof, and a thickener selected from the group consisting of an inorganic rheology modifier, hydroxyethyl cellulose and mixtures thereof.

In another embodiment, the present invention is directed to a method of controlling weeds comprising applying a composition of the present invention to the weeds or an area in need of weed control.

DETAILED DESCRIPTION OF THE INVENTION

Applicant discovered specific wetting agents that are capable of stabilizing high concentration flumioxazin compositions.

In one embodiment, the present invention is directed to an herbicidal composition comprising flumioxazin and a polyoxyethylene polyarylphenol phosphate or phosphate ester acid salts thereof.

Phosphate ester acid salts of polyoxyethylene tristyrylphenol phosphate suitable for use in the present invention include, but are not limited to calcium, sodium, potassium, ammonium and triethanolamine salts.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, nitrile, sulfonamide, or thiol as described herein. "Aryl" includes two or more aryl groups that are bound together via a fused ring structure, as in naphthalene, or are attached via one or more carbon-carbon bonds, as in biphenyl.

In a preferred embodiment, the polyoxyethylene polyarylphenol phosphate is potassium polyoxyethylene tristyrylphenol phosphate or triethanolamine polyoxyethylene tristyrylphenol phosphate.

In another embodiment, the present invention is directed to an aqueous herbicidal composition comprising flumioxazin, a polyoxyethylene polyarylphenol phosphate, a surfactant, a thickener, a wetting agent, an antifoaming agent, an antifreeze agent and a preservative.

In a preferred embodiment, the compositions of the present invention do not contain xanthan gum, an alkylphenol ethoxylate free nonionic wetter and dispersant package, or an attapulgite clay.

In another preferred embodiment, flumioxazin may be present at a concentration from about 30% to about 50% w/w, more preferably from about 40 to about 49% w/w, even more preferably from about 42% to about 46% w/w.

In another preferred embodiment, a polyoxyethylene polyarylphenol phosphate or a phosphate ester acid salt thereof may be present at a concentration from about 0.1% to about 10% w/w, more preferably from about 0.3% to about 5% w/w, even more preferably from about 0.5% to about 4.5% w/w, yet even more preferably from about 1% to about 4% w/w, yet more preferably from about 2.5% to about 3.5% w/w.

In another preferred embodiment, the thickener is selected from the group consisting of an inorganic rheology modifier, hydroxyethyl cellulose and a mixture thereof. Inorganic rheology modifiers suitable for use in the present invention include, but are not limited to, magnesium aluminum silicate, attapulgite, hydrophilic fumed silica, aluminum oxide and mixtures thereof.

The thickener may be present at a concentration from about 0.1% to about 10 w/w. In an even more preferred embodiment, the thickener may be a mixture of from about 0.1% to about 5% w/w hydrophobic fumed silica, from 0.1% to about 5% w/w aluminum oxide and from about 0.05% to about 2% w/w hydroxyethyl cellulose. In another even more preferred embodiment, the thickener may be a mixture of from about 0.1% to about 5% w/w magnesium aluminum silicate and from about 0.05% to about 2% w/w hydroxyethyl cellulose.

In another preferred embodiment, hydrophobic fumed silica may be present at a concentration from about 0.5% to about 3% w/w.

In another preferred embodiment, aluminum oxide may be present at a concentration from about 0.5% to about 3% w/w.

In another preferred embodiment, magnesium aluminum silicate may be present at a concentration from about 0.5% to about 3% w/w.

In another preferred embodiment, hydroxyethyl cellulose may be present at a concentration from about 0.05% to about 2% w/w, more preferably from about 0.1% to about 1% w/w, even more preferably from about 0.1% to about 0.15% w/w.

In another preferred embodiment, the acrylic graft copolymer may be present at a concentration from about 0.25% to about 10% w/w, more preferably from about 0.5% to about 5% w/w.

In another preferred embodiment, the acrylic graft copolymer may be a 35% acrylic graft copolymer, may be present at a concentration from about 1% to about 10% w/w, more preferably from about 0.5% to about 5% w/w.

In another preferred embodiment, the 35% acrylic graft copolymer has a density of 1.07 g/mL at 25° C., a flash point of greater than 100° C., a pour point of less than 0° C. and a viscosity of 200 mPa·s at 25° C.

Antifoaming agents suitable for use in the present invention include, but are not limited to, silicone antifoaming agents including silicone emulsions, vegetable oils, acetylenic glycols, and high molecular weight adducts of propylene oxide and lower polyoxyethylene and polyoxypropylene block polymers (wherein the number of octyl-, nonly- and phenylpolyoxyethylene/ethylene oxide units is >5) and long-chain alcohols and mixtures thereof. In a preferred embodiment, the antifoaming agent is a silicone emulsion. Antifoaming agents may be present at a concentration from about 0.01% to about 3% w/w, preferably from about 0.05% to about 2% w/w.

Antifreeze agents suitable for use in the present invention include, but are not limited to, ethylene glycol, propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, glycerol, pentaerythritol, 1,4-cyclohexanedimethanol, xylenol, and bisphenols such as bisphenol A. In a preferred embodiment, the antifreeze agent is propylene glycol. Antifreeze agents may be present at a concentration from about 1% to about 10% w/w, preferably from about 1% to about 40% w/w, more preferably from about 2% to about 20% w/w and most preferably from about 3 to about 15% w/w.

Preservatives suitable for use in the present invention include, but are not limited to, a 5-chloro-2-methyl-4-isothiazolin-3-one and 2-methyl-4-isothiazolin-3-one solution in water, such as Kathon® CG/ICP (available from Rohm and Haas Company) and Legend MK® (available from Rohm and Haas Company), 19.3% 1, 2-benzisothiazolin-3-one and a mixture of 1, 2-benzisothiazolin-3-one and 6.5% 2-bromo-2-nitro-1,3-propanediol. In a preferred embodiment the preservative is 19.3% 1, 2-benzisothiazolin-3-one. Preservatives may be present at a concentration from about 0.01% to about 0.5% w/w, more preferably from about 0.02% to about 0.4% w/w, even more preferably from about 0.03% to about 0.3% w/w.

In a preferred embodiment, the present invention is directed to an herbicidal composition comprising:
  from about 42% to about 46% w/w flumioxazin;
  from about 0.5% to about 5% w/w of an acrylic graft copolymer;
  from about 1% to about 4% w/w of a potassium salt of polyoxyethylene tristyrylphenol phosphate;
  from about 0.05% to about 2% w/w silicone emulsion;
  from about 0.03% to about 0.3% w/w of 19.3% 1, 2-benzisothiazolin-3-one;
  from about 3.0% to about 15% w/w propylene glycol;
  a mixture of from about 0.5% to about 3% w/w hydrophilic fumed silica and from about 0.5% to about 3% w/w aluminum oxide; and
  from about 0.1% to about 0.5% w/w hydroxyethyl cellulose.

In a preferred embodiment, the present invention is directed to an herbicidal composition comprising:
  from about 42% to about 46% w/w flumioxazin;
  from about 0.5% to about 5% w/w of an acrylic graft copolymer;
  from about 1% to about 4% w/w of a potassium salt of polyoxyethylene tristyrylphenol phosphate;
  from about 0.05% to about 2% w/w silicone emulsion;
  from about 0.03% to 0.3% w/w of 19.3% 1, 2-benzisothiazolin-3-one;
  from about 3% to about 15% w/w propylene glycol;
  from about 0.5% to about 3% w/w magnesium aluminum silicate; and
  from about 0.1% to about 0.5% w/w hydroxyethyl cellulose.

A stable aqueous herbicidal composition comprising:
  from about 30% to about 50% w/w flumioxazin;
  an acrylic graft copolymer;
  a polyoxyethylene polyarylphenol phosphate or phosphate ester acid salts thereof; and
  a thickener selected from the group consisting of an inorganic rheology modifier, hydroxyethyl cellulose and mixtures thereof, wherein the composition have a sprayability no more than 0.03% w/w.

In another embodiment, the present invention is directed to methods of controlling weeds comprising applying a composition of the present invention to the weeds or an area in need of weed control.

In another preferred embodiment, the compositions of the present invention may be applied sequentially or concurrently with glyphosate to control weeds.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying, chemigation (a process of applying the composition through the irrigation system), by granular application, or by impregnating the composition on fertilizer.

The compositions of the present invention can be prepared as concentrate formulations or as ready-to-use formulations. The compositions can be tank mixed.

The compositions and methods of the present invention can be applied successfully to crop plants and weeds that are resistant to glyphosate, glufosinate, or other herbicides. The composition and methods can also be applied to areas where genetically modified crops ("GMOs") or non-GMO crops are growing. The term "GMO crops" as used herein refers to crops that are genetically modified.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%. For example, the phrase "about 5.0% w/w" is to be understood as "from 4.5% to 5.5% w/w." Therefore, amounts within 10% of the claimed values are encompassed by the scope of the claims.

These representative embodiments are in no way limiting and are described solely to illustrate some aspects of the invention.

Further, the following examples are offered by way of illustration only and not by way of limitation.

EXAMPLES

TABLE 1

| Formulation | Prior Art Flumioxazin Formulations | | | | | |
|---|---|---|---|---|---|---|
| | Formulation X | Formulation Y | Formulation A | Formulation B | Formulation C | Formulation D |
| Active Ingredient | 44.0% Flumioxazin | 44.13% Flumioxazin (99.7%) | 41.62% Flumioxazin (99.7%) | 41.62% Flumioxazin (99.7%) | 44.13% Flumioxazin (99.7%) | 44.13% Flumioxazin (99.7%) |
| Surfactant | 4.0% Atlox ® 4913 | 4.0% Atlox ® 4913 | 4.0% Atlox ® 4913 | 4.0% Atlox ® 4913 | 6.0% Atlox ® 4913 | 8.0% Atlox ® 4913 |
| Wetting Agent | 2.0% Atlox ® 4894 | 2.0% Atlox ® 4894 | 2.0% Atlox ® 4894 | 2.0% Atlox ® 4894 | 3.0% Atlox ® 4894 | 4.0% Atlox ® 4894 |
| Antifoaming Agent | 0.1% SAG 30 | 0.1% Antifoam FG-10 | 0.1% Antifoam FG-10 | 0.1% Antifoam FG-10 | 0.1% Antifoam FG-10 | 0.1% Antifoam FG-10 |
| Preservative | 0.1% Proxel ® BN | 0.1% Proxel GXL | 0.1% Proxel GXL | 0.1% Proxel GXL | 0.1% Proxel GXL | 0.1% Proxel GXL |
| Antifreeze agent | 6% Propylene glycol | 6% Propylene glycol | 6% Propylene glycol | 6% Propylene glycol | 6% Propylene glycol | 6% Propylene glycol |
| Thickener | 0.15% Rhodopol ® | 0.15% Kelzan ® CC | 1.5% Hydrophilic fumed silica | 0.8% Hydrophilic fumed silica | 1.5% Hydrophilic fumed silica | 1.5% Hydrophilic fumed silica |
| Thickener | 0.3% Attagel ® 50 | 0.3% Attagel ® 50 | 1.5% Aluminum oxide | 0.8% Aluminum oxide | 1.5% Aluminum oxide | 1.5% Aluminum oxide |
| Thickener | — | — | — | 1% Attagel ® 50 | — | — |
| Triethanolamine | — | — | 0.035 | — | 0.035 | 0.035 |
| Diluent | Q.S. | Q.S. | Q.S. | Q.S. | Q.S. | Q.S. |

Atlox ® 4913 is a proprietary 35% graft copolymer available from Croda Americas LLC.
Atlox ® 4894 is an alkylphenol ethoxylate free nonionic wetter and dispersant package available from Croda Americas LLC.
Dow Corning ® Antifoam A is a proprietary silicone based antifoam emulsion.
SAG* 30 is a polydimethylsiloxane emulsion containing 3-7% of a proprietary fatty acid ethoxylate.
Aerosil ® 200 (CAS #112 945-52-5, 7631-86-9) is used as the source of hydrophilic fumed silica and is available from Evonik Industries.
Aeroxide ® Alu C (CAS #1344-28-1) is used as the source of aluminum oxide and is available from Evonik Industries.
Proxel ® GXL is an aqueous solution of 19.3% 1,2-benzisothiazolin-3-one available from Arch Chemicals, Inc.
Proxel ® BN is an aqueous solution of 13.5% 1,2- benzisothiazolin-3-one and 6.5% 2-bromo-2-nitro-1,3-propanediol.
Kelzan ® CC is a xanthan gum (CAS #804483-43-0) available from CP Kelco.
Attagel ® 50 is an inert attapulgite clay powder.
Rhodopol ® is a xanthan gum (CAS #11138-6-2) available from Solvay.
Triethanolamine is an organic base (CAS #102-71-6) for pH adjustment.

TABLE 2

Composition 1

| Ingredient | Concentration | Function |
| --- | --- | --- |
| Flumioxazin (99.7%) | 44.13% w/w | Active Ingredient |
| Acrylic Graft Copolymer (35%) | 4.5% w/w | Surfactant |
| Polyoxyethylene tristyrylphenol phosphate, potassium salt | 3.0% w/w | Wetting Agent |
| Silicone emulsion | 0.1% w/w | Antifoaming Agent |
| 1,2-benzisothiazolin-3-one (19.3%) | 0.05% w/w | Preservative |
| Propylene glycol | 7% w/w | Antifreeze agent |
| Hydrophilic fumed silica | 0.5-3% w/w | Thickener |
| Aluminum oxide | 0.2-0.75% w/w | Thickener |
| Hydroxyethyl cellulose | 0.0-0.3% w/w | Thickener |
| Water | Q.S. | Diluent |

TABLE 3

Composition 2

| Ingredient | Concentration | Function |
| --- | --- | --- |
| Flumioxazin (99.7%) | 44.13% w/w | Active Ingredient |
| Acrylic Graft Copolymer (35%) | 4.5% w/w | Surfactant |
| Polyoxyethylene tristyrylphenol phosphate, potassium salt | 3.0% w/w | Wetting Agent |
| Silicone emulsion | 0.1% w/w | Antifoaming Agent |
| 1,2-benzisothiazolin-3-one (19.3%) | 0.05% w/w | Preservative |
| Propylene glycol | 7% w/w | Antifreeze agent |
| Magnesium aluminum silicate | 0.5-2% | Thickener |
| Hydroxyethyl cellulose | 0.0-0.3% w/w | Thickener |
| Water | Q.S. | Diluent |

TABLE 4

Composition 3

| Ingredient | Concentration | Function |
| --- | --- | --- |
| Flumioxazin (99.7%) | 44.13% w/w | Active Ingredient |
| Acrylic Graft Copolymer (35%) | 4.5% w/w | Surfactant |
| Polyoxyethylene tristyrylphenol phosphate, potassium salt | 3.0% w/w | Wetting Agent |
| Silicone emulsion | 0.1% w/w | Antifoaming Agent |
| 1,2-benzisothiazolin-3-one (19.3%) | 0.05% w/w | Preservative |
| Propylene glycol | 7% w/w | Antifreeze agent |
| Hydrophilic fumed silica | 0.5-3% w/w | Thickener |
| Aluminum oxide | 0.2-0.75% w/w | Thickener |
| Hydroxyethyl cellulose | 0.0-0.3% w/w | Thickener |
| Triethanolamine | 0.035% w/w | Neutralizer |
| Water | Q.S. | Diluent |

Tersperse® 2500 is used as the source of the 35% acrylic graft copolymer and is available from Huntsman Petrochemical. Tersperse® 2500 has a density of 1.07 g/mL at 25° C., a flash point of greater than 100° C., a pour point of less than 0° C., and a viscosity of 200 mPa·s at 25° C.

Stepfac™ TSP PE-K (CAS #163436-84-8) is used as the source of polyoxyethylene tristyrylphenol phosphate, potassium salt and is available from Stepan Corp.

Antifoam 30 FG is used as the source of silicone emulsion antifoaming agent and is available from Performance Chemicals, LLC.

Aerosil® 200 (CAS #112 945-52-5, 7631-86-9) is used as the source of hydrophilic fumed silica and is available from Evonik Industries.

Aeroxide® Alu C (CAS #1344-28-1) is used as the source of aluminum oxide and is available from Evonik Industries.

Cellosize® QP 100MH is used as the source of hydroxyethyl cellulose and is available from Dow Chemical Company.

Veegum® R (CAS #1302-78-9) is used as the source of magnesium aluminum silicate and is available from Vanderbilt Minerals, LLC.

Triethanolamine is an organic base (CAS #102-71-6) for pH adjustment.

EXAMPLES

Example 1—Process for Preparation of Compositions of the Invention

Hydroxyethyl cellulose was dissolved in a preservative containing alkali water to create a hydroxyethyl cellulose solution. Excipients including a dispersant, a wetting agent, an antifoaming agent, an antifreeze agent, a preservative and inorganic thickeners were dissolved or dispersed in water under continuous agitation until the composition was homogenous. Once homogenous, Flumioxazin herbicide was added to the composition. After mixing under high-shear agitation, the composition was wet milled to a median particle size of about 2 micrometers using zirconia beads to create a mill base. The hydroxyethyl cellulose solution was then added to the mill base.

Example 2—Stability of Flumioxazin Suspension Concentrates

Formulation X, Formulation Y, Formulation A, Formulation B, and Formulation Y, from Table 1 above, Composition 1 (containing 1% hydrophobic fumed silica, 0.2% aluminum oxide and 0.15% hydroxyethyl cellulose) from Table 2 above, Composition 2 (containing 1% magnesium aluminum silicate and 0.15% hydroxyethyl cellulose) from Table 3 above, and Composition 3 (containing 1% magnesium aluminum silicate, 0.15% hydroxyethyl cellulose) and 0.035% w/w from Table 4 above were each subjected to 3 extreme temperature conditions, specifically, 5 free/thaw cycles (−10° C. to 40° C.), 2 weeks at 54° C., 4 weeks at 50° C., and 8 weeks at 50° C. to determine long-term storage stability. Sprayability, dispersibility, re-dispersibility, suspensibility, and viscosity were measured prior to and at the conclusion of each of the extreme temperature conditions.

Method
Sprayability

Sprayability is based on the following test procedure and calculation. A 100-mesh (150 micrometer) sieve is weighed and the weight is recorded as the tare weight ("W0"). The sieve is then placed over a wide mouth jar.

50 grams of a composition ("W") is weighed and added to 600 milliliters of tap water in a beaker and left undisturbed until the composition was thoroughly wet. Once wet the composition was stirred for approximately two minutes to create a dispersion.

The entire dispersion was poured through the sieve followed by rinsing. Rinsing was done using tap water at a flow rate at about 1.5 liters per minute for one minute. The sieve with the residue was then placed in a drying oven and dried to create the dry sieve with the residue ("W1"). Percent sprayability was then calculated with the following equation: (W1−W0)/W*100.

A large percent sprayability indicates poor formulation stability leading to nozzle clogging during field application. In embodiments, the aqueous herbicide formulations have an excellent long-term stability. The long-term stability can be measured using the parameter of sprayability by subjecting the formulation through the following conditions: a) 5 free/thaw cycles from −10° C. to 40° C., b) 2 weeks at 54° C., c) 4 weeks at 50° C., and d) 8 weeks at 50° C. Formulation with a good long-term stability should have a sprayability no more than 0.05% w/w, including no more than 0.03% w/w, or no more than 0.025% w/w, under all conditions.

Suspensibility

Suspensibility is based on the following test procedure and calculation. One gram of a composition ("W") was added to 50 milliliters of tap water in a beaker and left undisturbed until the composition was thoroughly wet. Once wet the composition was stirred for approximately two minutes to create a dispersion.

The entire dispersion was transferred into a 100-milliliter graduated cylinder. The cylinder was then filled to the 100-milliliter mark using 324 parts per million hard water. The cylinder was run through 30 cycles of inversion and reversion with one complete cycle every two seconds. The graduated cylinder was then left undisturbed for 30 minutes. Following rest, the top 90 milliliters were removed from the cylinder using a vacuum apparatus. The remaining 10 milliliters of material was then transferred into a tared evaporation dish ("W0"). The dish with the material was placed in a drying oven and dried to a constant weight ("W1"). Percent suspensibility was calculated using the following equation: ((W*A/100)−(W1−W0))*111/(W*A/100), wherein A=percentage of solid content in the sample (determined from the formulation of the composition).

A low percent suspensibility indicates poor formulation stability leading to precipitation of the composition.

Syneresis

Syneresis was determined by placing the composition in a 125-milliliter high density polyethylene (HDPE) bottle at the above-mentioned storage conditions. The height of the top clear liquid phase was then measured. Syneresis is calculated using the following equation:

Height of top clear liquid phase/height of total sample.

A high syneresis value indicates poor formulation stability.

Dispersibility

Dispersibility was measured by adding one milliliter of a composition to a 100-milliliter graduated cylinder containing 99 milliliters of 324 parts per million hard water. The cylinder was then run through cycles of inversion and reversion with one complete cycle every 2 seconds. Dispersiblity is the number of cycles it takes to disperse the formulation uniformly. A high dispersibility value indicates poor formulation stability.

Redispersibility

After the dispersibility test is done, the dispersed formulation was undisturbed for 24 hours. The cylinder was then run through cycles of inversion and reversion with one complete cycle every two seconds. Redispersiblity is the number of cycles it takes to disperse the formulation uniformly after sitting. A high redispersibility value indicates poor formulation stability.

Rheology Properties

The rheological properties including viscosity, G', G" was measured using Haak Mars Modular Advanced Rheometer System made by Thermo Scientific, model number: MARS 2. Results of these tests can be seen in Tables 5-9, below.

TABLE 5

Long-term Storage Stability of Formulation X

|  | T0 | F/T (5 Cycles) | 54° C. (2 weeks) | 50° C. (4 weeks) | 50° C. (8 weeks) |
| --- | --- | --- | --- | --- | --- |
| Syneresis | — | 0% | 6.82% | 6.32% | 15% |
| Sprayability | 0.002% | 0.005% | 0.046% | 0.052% | 0.048 |
| Dispersibility | 3 | 4 | 2 | 3 | 4 |
| Redispersibilty | 24 | 25 | 36 | 30 | 30 |
| Suspensibility | 90.02% | 89.44% | 87.04% | 87.81% | 86.01% |

TABLE 6

Long-term Storage Stability of Formulation Y

|  | T0 | F/T (5 Cycles) | 54° C. (2 weeks) | 50° C. (4 weeks) |
| --- | --- | --- | --- | --- |
| Syneresis | — | 0% | 6.82% | 6.32% |
| Sprayability | 0% | 0.065% | 0.078% | 0.063% |
| Dispersibility | — | 5 | 4 | 3 |
| Redispersibilty | — | 21 | 30 | 23 |
| Suspensibility | 97.95% | 94.62% | 95.12% | 93.94% |
| Viscosity at shear rate 1 $S^{-1}$ (mPa) | 1864 | 1696 | 1727 | 1773 |
| Viscosity at shear rate 50 $S^{-1}$ (mPa) | 129.7 | 128.2 | 137.3 | 139.7 |
| G' (t = 0.1 Pa) | 15.76 | 12.03 | 13.13 | 12.28 |
| G" (t = 0.1 Pa) | 6.274 | 5.319 | 7.165 | 6.627 |
| G'/G" | 2.51 | 2.26 | 1.83 | 1.85 |

TABLE 7

Long-term Storage Stability of Formulation A

|  | T0 | F/T (5 Cycles) | 54° C. (2 weeks) |
| --- | --- | --- | --- |
| Syneresis | — | — | — |
| Sprayability | 0.039% | 0.060% | 0.036% |
| Dispersibility | 5 | 10 | 14 |
| Redispersibilty | 8 | 6 | 7 |
| Suspensibility | 71.48% | 71.29% | 57.33% |
| Viscosity at shear rate 1 $S^{-1}$ (mPa) | 1904 | 2241 | 2338 |
| Viscosity at shear rate 50 $S^{-1}$ (mPa) | 114.6 | 133.5 | 140 |
| G' (t = 0.1 Pa) | 50.52 | 95.44 | 101.7 |
| G" (t = 0.1 Pa) | 13.12 | 23.28 | 25.71 |
| G'/G" | 3.85 | 4.09 | 3.96 |

TABLE 8

Long-term Storage Stability of Formulation B

|  | T0 | F/T (5 Cycles) | 54° C. (2 weeks) |
| --- | --- | --- | --- |
| Syneresis | — | — | — |
| Sprayability | 0.048% | 0.000% | 0.024% |
| Dispersibility | 6 | 9 | 10 |
| Redispersibilty | 10 | 7 | 8 |
| Suspensibility | 58.65% | 46.73% | 41.68% |

TABLE 8-continued

Long-term Storage Stability of Formulation B

|  | T0 | F/T (5 Cycles) | 54° C. (2 weeks) |
|---|---|---|---|
| Viscosity at shear rate 1 S$^{-1}$ (mPa) | 875.1 | 950.7 | 1302 |
| Viscosity at shear rate 50 S$^{-1}$ (mPa) | 79.18 | 77.28 | 96.53 |
| G' (t = 0.1 Pa) | 70.96 | 28.89 | 16.64 |
| G" (t = 0.1 Pa) | 22.08 | 13.32 | 57.07 |
| G'/G" | 3.21 | 2.17 | 0.29 |

TABLE 9

Long-term Storage Stability of Composition 1

|  | Composition 1 | | | | Composition 1 (large batch) | | | |
|---|---|---|---|---|---|---|---|---|
|  | T0 | 54° C. (2 weeks) | 50° C. (4 weeks) | 50° C. (8 weeks) | T0 | 54° C. (2 weeks) | 50° C. (4 weeks) | 50° C. (8 weeks) |
| Syneresis | — | 8.64% | 15.71% | 18.84% | — | 18.46% | 9.76% | 18.92% |
| Sprayability | 0% | 0.022% | 0.014% | 0.002% | 0% | 0.009% | 0.000% | 0.011% |
| Dispersibility | 3 | 3 | 5 | 5 | 3 | 3 | 6 | 5 |
| Redispersibilty | 28 | 23 | 28 | 26 | 30 | 5/22 | 27 | 28 |
| Suspensibility | 97% | 93.65% | 94.29% | 93.11 | 97.00% | 95.81% | 97.21% | 95.97% |
| Viscosity at shear rate 1 S$^{-1}$ (mPa) | 1483 | 1210 | — | — | 1483 | 1462 | 1278 | — |
| Viscosity at shear rate 50 S$^{-1}$ (mPa) | 224.9 | 233.5 | — | — | 224.9 | 257.0 | 250.4 | — |
| G' (t = 0.1 Pa) | 24.7 | 19.47 | — | — | 24.7 | 23.94 | 20.84 | — |
| G" (t = 0.1 Pa) | 7.92 | 8.161 | — | — | 7.92 | 9.867 | 8.58 | — |
| G'/G" | 3.12 | 2.39 | — | — | 3.12 | 2.43 | 2.43 | — |

TABLE 10

Long-term Storage Stability of Composition 2

|  | T0 | 54° C. (2 weeks) | 50° C. (4 weeks) | 50° C. (8 weeks) |
|---|---|---|---|---|
| Syneresis | — | 8.89% | 6.67% | 13.19% |
| Sprayability | 0.000% | 0.000% | 0.000% | 0.004% |
| Dispersibility | 3 | 3 | 5 | 4 |
| Redispersibilty | 5 | 30 | 20 | 34 |
| Suspensibility | 96.69% | 95.07% | 95.52% | 94.57% |
| Viscosity at shear rate 1 S$^{-1}$ (mPa) | 1089 | 1358 | 857.3 | — |
| Viscosity at shear rate 50 S$^{-1}$ (mPa) | 151.7 | 184.7 | 142.1 | — |
| G' (t = 0.1 Pa) | 11.55 | 3.327 | 1.396 | — |
| G" (t = 0.1 Pa) | 5.412 | 3.744 | 2.184 | — |

TABLE 11

Long-term Storage Stability of Composition 3

|  | T0 | F/T (5 Cycles) | 54° C. (2 weeks) | 50° C. (4 weeks) | 50° C. (8 weeks) |
|---|---|---|---|---|---|
| Syneresis | — | 5.08% | 11.67% | 15.00% | 22.81% |
| Sprayability | 0% | 0.004% | 0.005% | 0.018% | 0.010 |
| Dispersibility | 5 | 5 | 6 | 4 | 3 |
| Redispersibilty | 34 | 28 | 25 | 26 | 22 |
| Suspensibility | 96.12% | 93.98% | 93.10% | 93.45% | 94.06 |
| Viscosity at shear rate 1 S$^{-1}$ (mPa) | 1778 | 1499 | 1409 | 1391 | 1554 |
| Viscosity at shear rate 50 S$^{-1}$ (mPa) | 250.9 | 265.7 | 267.1 | 245.3 | 260.7 |
| G' (t = 0.1 Pa) | 31.54 | 22.2 | 25.84 | 24.87 | 46.19 |
| G" (t = 0.1 Pa) | 9.75 | 9.235 | 10.2 | 9.782 | 18.6 |
|  | 3.23 | 2.4 | 2.53 | 2.54 | 2.48 |

As seen in Tables 9-11 Composition 1 Composition 2 and Composition 3 had good sprayability (less than 0.03%) whereas Formulations X, Y, A, and B had unacceptable sprayability (greater than 0.05%), or/and unacceptable suspensibility (lower than 75%). After 5 freeze/thaw cycles, formulation C gelled. It also gelled after 2 weeks at 54° C. The mill base of formulation D was too thick to continue processing. Thus, compositions of the present invention and especially Composition 1, Composition 2 and Composition 3 are superior to prior art formulations in storage stability and suspensibility.

Example 2. Stability of Flumioxazin Suspension Concentrates with Various Wetting Agents Method The wetting agent of Composition 1 (3% polyoxyethylene tristyrylphenol phosphate, potassium salt) was replaced with an equivalent concentration of each of the following wetting agents:
Multiwet™ (sodium dioctyl sulfosuccinate; available from Croda Americas LLC); Stepwet® DF-95 (sodium lauryl sulfate; Stepwet is a registered trademark and available from Stepan Company Corp.); Morwet® 3028 (sodium alkylnaphthalenesulfonate; Morwet is a registered trademark of and available from Akzo Nobel Surface Chemistry LLC); Span® 80-NV-LQ (sorbinate oleate, Span is a registered trademark of Uniqema Americas LLC); Pluronic® P-104 (methyloxirane polymer; Pluronic is a registered trademark of and available from BASF Corporation); and Agnique® PG 9116 (alkyl polyglycoside; Agnique is a registered trademark of and available from Cognis Corporation), and subjected to rheological analysis. However, the compositions containing Morwet® 3028 and Span® 80-NV-LQ were too thick upon milling and could not be subjected to rheological testing. Compositions containing the other 4 wetting agents were each subjected to 2 weeks at 54° C., to determine long-term storage stability of these various wetting agents. Sprayability, dispersibility, re-dispersibility, suspensibility, and viscosity were measured prior to and at the conclusion the extreme temperature conditions. Results of these tests can be seen in Table 12, below.

TABLE 12

Storage Stability of Various Wetting Agents for Composition 1

| 3.0% Wetting Agent Condition | Multiwet ™ TO | Multiwet ™ 54° C. (2 weeks) | Stepwet ® DF-95 TO | Stepwet ® DF-95 54° C. (2 weeks) | Pluronic ® P-104 TO | Pluronic ® P-104 54° C. (2 weeks) | Agnique ® PG 9116 TO | Agnique ® PG 9116 54° C. (2 weeks) |
|---|---|---|---|---|---|---|---|---|
| Syneresis | — | 17% | — | 3.4% | — | 6.25% | — | 13.95% |
| Sprayability | 0.011% | 0.056% | 0.014% | 0.033% | 0.000% | 0.000% | 0.000% | 0.039% |
| Dispersibility | 8 | 11 | 7 | 11 | 15 | 8 | 13 | 13 |
| Redispersibilty | 17 | 11 | 7 | 5 | 15 | 9 | 23 | 7 |
| Suspensibility | 96.77 | 95.73 | 96.73 | 95.55 | 95.85 | 88.41 | 97.20 | 95.30 |
| Viscosity at shear rate 1 $S^{-1}$ (mPa) | 3033 | 1558 | 5412 | 2705 | 844.7 | 572.4 | 2615 | 1862 |
| Viscosity at shear rate 50 $S^{-1}$ (mPa) | 271.3 | 212.7 | 485.7 | 329.7 | 138.1 | 123.1 | 269.8 | 247.3 |
| G' (t = 0.1 Pa) | 67.17 | 26.55 | 289.8 | 162.9 | 2.006 | 1.227 | 105.8 | 66.60 |
| G" ( t= 0.1 Pa) | 22.28 | 16.73 | 73.68 | 97.27 | 3.912 | 2.599 | 50.84 | 41.07 |
| G'/G" | 3.01 | 1.59 | 3.93 | 1.67 | 0.51 | 0.47 | 2.08 | 1.62 |

As seen in Table 12, after being stored at elevated temperature, none of the wetting agents resulted in stable flumioxazin suspension concentrates possessing both good sprayability (less than 0.03%) and good suspensibility (greater than 90%). However, polyoxyethylene tristyrylphenol phosphate, potassium salt as used in Composition 1 and Composition 2, unexpectedly result in stable flumioxazin suspension concentrates.

What is claimed is:

1. A mixture comprising glufosinate and a composition comprising:
from about 42% to about 46% w/w flumioxazin;
from about 0.5% to about 5% w/w of an acrylic graft copolymer;
from about 1% to about 4% w/w of a potassium salt of polyoxyethylene tristyrylphenol phosphate;
from about 0.05% to about 2% w/w silicone emulsion;
from about 0.03% to about 0.3% w/w of a first component comprising about 19.3% w/w 1, 2-benzisothiazolin-3-one wherein w/w of 1,2-benzisothiazolin-3-one denotes weight by total weight of the first component;
from about 3.0% to about 15% w/w propylene glycol;
from about 0.5% to about 1.5% w/w hydrophilic fumed silica;
from about 0.1% to about 0.75% w/w aluminum oxide: and
from about 0.1% to about 0.5% w/w hydroxyethyl cellulose,
wherein w/w denotes weight by total weight of the composition.

2. A method of controlling a weed comprising applying the mixture of claim 1 to the weed or an area in need of weed control.

3. A tank mix comprising glufosinate water and a composition comprising:
from about 42% to about 46% w/w flumioxazin;
from about 0.5% to about 5% w/w of an acrylic graft copolymer;
from about 1% to about 4% w/w of a potassium salt of polyoxyethylene tristyrylphenol phosphate;
from about 0.05% to about 2% w/w silicone emulsion;
from about 0.03% to about 0.3% w/w of a first component comprising about 19.3% w/w 1, 2-benzisothiazolin-3-one wherein w/w of 1,2-benzisothiazolin-3-one denotes weight by total weight of the first component;
from about 3.0% to about 15% w/w propylene glycol;
from about 0.5% to about 1.5% w/w hydrophilic fumed silica;
from about 0.1% to about 0.75% w/w aluminum oxide: and
from about 0.1% to about 0.5% w/w hydroxyethyl cellulose,
wherein w/w denotes weight by total weight of the composition.

* * * * *